United States Patent [19]

Eve et al.

[11] Patent Number: 4,517,345

[45] Date of Patent: May 14, 1985

[54] POLYMERIZATION PROCESS

[75] Inventors: Paul L. Eve; John G. Speakman, both of West Lothian, Scotland

[73] Assignee: BP Chemicals Limited, London, England

[21] Appl. No.: 410,576

[22] Filed: Aug. 23, 1982

Related U.S. Application Data

[63] Continuation of Ser. No. 133,825, Mar. 25, 1980, abandoned.

[30] Foreign Application Priority Data

Mar. 28, 1979 [GB] United Kingdom ............... 7911257

[51] Int. Cl.$^3$ ............................ C08F 4/24; C08F 10/02
[52] U.S. Cl. .................................. 526/105; 502/113; 526/106; 526/352
[58] Field of Search ............... 252/430; 526/105, 106; 502/113

[56] References Cited

U.S. PATENT DOCUMENTS

| | | | |
|---|---|---|---|
| 2,824,089 | 2/1958 | Peters et al. | 526/352 |
| 2,912,421 | 11/1959 | Luveland et al. | 526/107 |
| 3,158,594 | 11/1964 | Weil et al. | 526/105 |
| 3,622,521 | 11/1971 | Hogan et al. | 526/106 |
| 3,646,000 | 2/1972 | Horvath | 526/107 |
| 3,780,011 | 12/1973 | Pullukat et al. | 526/106 |
| 3,891,611 | 6/1975 | Abe et al. | 526/105 |
| 3,970,613 | 7/1976 | Goldie et al. | 526/106 |
| 4,041,224 | 8/1977 | Hoff et al. | 526/106 |

FOREIGN PATENT DOCUMENTS 1405255 9/1975 United Kingdom .
1433052 4/1976 United Kingdom .

*Primary Examiner*—Edward J. Smith
*Attorney, Agent, or Firm*—Brooks Haidt Haffner and Delahunty

[57] ABSTRACT

A process and catalyst for polymerizing olefins, especially ethylene or a mixture of ethylene with up to 40 wt % (based on total monomer) or other 1-olefinic monomer, the process comprising (a) supporting a chromium compound on a refractory oxide support material, (b) adding one or more tetravalent titanium compounds, (c) heating the product under such conditions that an active polymerization catalyst in the presence of one or more organometallic compounds wherein the metal is of groups 1A, 2A, 2B or 3A of the Periodic Table (Mendeleef), especially aluminium trialkyls. Step (d) is preferably carried out in the presence of a polyene modifier. The refractory oxide support material is preferably silica. The produced polyolefins are also claimed.

10 Claims, No Drawings

POLYMERIZATION PROCESS

This is a continuation of application Ser. No. 133,825, filed Mar. 25, 1980 abandoned.

The present invention relates to a process for polymerising 1-olefins and to a catalyst therefor.

More particularly the invention relates to a process for polymerising 1-olefins, for example ethylene, using a modified Phillips catalyst. Phillips catalysts have been extensively described in the literature. They are formed by supporting chromium trioxide, or a compound calcinable thereto, on a refractory oxide support material, for example silica, alumina, zirconia, thoria or silica-alumina and heating in a non-reducing atmosphere, preferably an oxidising atmosphere to produce an active polymerisation catalyst. The produced catalyst is used to polymerise 1-olefins using the so-called "solution form" or "particle form" process. In the "solution form" process the monomeric 1-olefin which is normally ethylene or a mixture of ethylene with up to about 40 wt % of other 1-olefins, is contacted with a suspension of the catalyst in a liquid hydrocarbon which is a solvent for the polymer at the polymerisation temperature employed. In the "particle form" process the monomer 1-olefin is contacted with a suspension or a fluidised bed of the catalyst particles in a fluid medium under conditions such that the polymeric 1-olefin forms as solid particles suspended in or fluidised in the fluid medium. The fluid medium can be for example a liquid hydrocarbon or a gas. Examples of suitable liquid hydrocarbons are isobutane and n-pentane. Examples of suitable gases are nitrogen or argon mixed with the gaseous monomer, or the undiluted gaseous monomer. Processes of this type are described in, for example UK patent specifications Nos. 790,195. 704,641, 853,414, 886,784 and 899,156. It is also known to modify Phillips catalysts with titanium compound, for example to render the catalyst capable of producing polyolefins having increased melt index (i.e. lower molecular weight) or to increase the stress crack resistance of the produced polyolefin. Catalysts of this type are described in, for example, U.S. Pat. No. 3,622,521 and UK patent specifications Nos. 1,334,662 and 1,326,167.

U.S. Pat. No. 3,351,623 discloses a catalyst for polymerising ethylene at a temperature in the range 275° to 335° F., i.e. under solution form process conditions, the catalyst being one which forms on mixing (1) an oxide component selected from the group consisting of silica; mixtures of silica and alumina containing up to 25 wt % alumina; and mixtures of chromium oxide and at least one material selected from the group consisting of silica, alumina, zirconia and thoria, at least part of the chromium being in the hexavalent state at the initial contacting of the monomer therewith, (2) an organo metal component of formula $R_xM$ wherein R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminium, gallium, indium, thallium, zinc, boron, lead, lithium, zirconium, cabalt, magnesium and tin; and x is an integer equal to the valence of M, and (3) a vanadium component selected from the group consisting of vanadium chelates and vanadyl chelates. U.S. Pat. No. 3,351,623 seeks to produce a catalyst that permits the use of high polymerisation temperatures to obtain relatively low melt index polymer.

Whilst the conventional particle form polymerisation process produces polyolefins suitable for many applications, there is a need for grades of polyolefins having a high average molecular weight and broad molecular weight distribution.

It is an object of the present invention to provide a process for polymerising certain 1-olefins to polymers having increased average molecular weight and broader molecular weight distribution compared with conventional Phillips processes employing unmodified Phillips catalysts.

Accordingly the present invention provides a process for polymerising ethylene or a mixture of ethylene with up to 40 wt % (based on total monomer) of other 1-olefinic monomer comprising (a) supporting chromium oxide, or a compound calcinable thereto, on a refractory oxide support material, (b) adding one or more tetravalent titanium compounds selected from (1) $TiO_2$, (2) $TiOCl_2$, (3) titanium acetyl acetonate compounds, (4) alkanolamine titanates and (5) compounds having the general formula $Ti(OR)_mX_n$, wherein $m+n$ is 4, m is zero or an integer from 1 to 4, R is an organic hydrocarbon group having 1 to 12 carbon atoms, X is halogen or a hydrocarbon group and when the titanium compound contains more than one R or X group the groups may be the same or different, (c) heating the product under such conditions that an active polymerisation catalyst is formed, (d) and contacting the monomer with the active polymerisation catalyst in the presence of one or more organometallic compounds having the general formula $MR^2_pY_{q-p}$ wherein M is a metal of groups 1A, 2A, 2B or 3A or the Periodic Table (Mendeleef), $R^2$ is a hydrocarbon group containing 1 to 10 carbon atoms, Y is hydrogen or halogen, q is the valency of M, p is an integer from 1 to q inclusive and when the organometallic compound contains more than one $R^2$ or Y group they may be the same or different.

The monomer employed in the present invention is either ethylene or a mixture of ethylene with up to 40 wt % preferably up to 25 wt % of other 1-olefinic monomer, preferably 1-butene, 1-pentene, 1-hexene, or 4-methyl-1-pentene.

The chromium compound can be chromium oxide (i.e. $CrO_3$) or a compound calcinable thereto, for example chromium nitrate, chromium carbonate, chromium acetate, ammonium chromate, chromyl chloride or tertiary butyl chromate.

The refractory oxide support material can be, for example silica, silica-alumina, silica-titania, alumina, zirconia or thoria. Silica is preferred, particularly silica having a mean particle diameter in the range 20 to 150 microns; and a surface area in the range 150 to 600 square meters per gramme.

The quantity of chromium compound supported on the refractory oxide is suitably such as to provide a chromium concentration of at least 0.1%, preferably in the range 0.2-30 wt % most preferably 0.3-5.0 wt % based on chromium compound and support together.

The supporting of the chromium compound on the refractory oxide support material can be achieved, for example, by dissolving a soluble chromium compound in a volatile liquid, impregnating the support material with the solution and evaporating the solvent; by impregnating the support with a liquid chromium compound, e.g. chromyl chloride; by passing the vapour of a volatile chromium compound, e.g. chromyl chloride, into a bed of the support material; or by mixing together a finely divided chromium compound and the support material in the presence of a small quantity of solvent, the quantity being insufficient to cause substantial agglomeration of the support material, continuing the mixing until a substantially homogeneous mix is obtained and then evaporating the solvent. Examples of solutions that can be used to impregnate the support material are chromium trioxide/water, ammonium chromate/water, chromium acetate/water, tertiary butyl chromate/hexane, chromyl chloride/chloroform.

When the titanium compound employed in the present invention is $Ti(OR)_mX_n$, R is preferably selected from alkyl, aryl, cycloalkyl and combinations thereof, for example aralkyl and alkaryl, each group having from 1 to 12 carbon atoms and X is preferably selected from R, cyclopentadienyl, alkenyl and halogen.

Titanium compounds represented by the formula $(RO)_4Ti$ are preferred particularly the alkyl compounds having from 1 to 6 carbon atoms in each alkyl group for example tetraethyl titanate and tetraisopropyl titanate. The titanium acetyl acetonate compound can be, for example, titanium diacetylacetonate di-isopropylate, titanium dichloro diacetyl acetonate or the so called "titanium acetyl acetonate" or "titanyl acetyl acetonate". The alkanolamine titanate can be for example triethanolamine titanate.

The quantity of titanium compound employed is suitably sufficient to give a titanium concentration in the product from step (b) in the range 0.05 to 20 wt %, preferably 0.5 to 5 wt %.

The titanium compound is preferably added to the supported chromium compound in a form in which it becomes well dispersed. For example if the titanium compound is liquid it can be mixed with the supported chromium compound as such, if desired. If it is a liquid or a solid it can be dissolved in a suitable non-aqueous solvent or comminuted in a non-aqueous diluent and then mixed with the supported chromium compound. Alternatively, the titanium compound can be added as a vapour if it is volatile, or carried into the supported chromium compound as an aerosol in a suitable carrier gas, for example nitrogen.

Further details of methods of adding titanium to Phillips-type chromium oxide catalysts are described in UK patent specifications Nos. 1,334,662, 1,326,167 and U.S. Pat. No. 3,622,521.

After the desired quantity of titanium compound has been added, the product is heated under conditions such that it is converted into a material catalytically active in polymerising 1-olefinic monomer. The temperature to which the supported chromium compound modified with titanium must be heated to form an active polymerisation catalyst (hereinafter referred to as the activation temperature) is at least 250° C. and not higher than the temperature at which the support commences to sinter. Preferably the activation temperature is in the range 400° to 900° C., most preferably 500° to 800° C. In general, the higher the activation temperature employed within the aforementioned ranges, the lower becomes the average molecular weight of polyolefin produced over the catalyst. The heating time is suitably within the range 5 minutes to 24 hours, preferably 30 minutes to 15 hours although times outside the broader range can be employed if desired.

It was formerly believed that to be an effective polymerisation catalyst a "Phillips" catalyst must contain at least some chromium in hexavalent form. Whilst it is true that most, if not all, "Phillips" catalysts do contain hexavalent chromium it is now believed that the olefin polymerisation catalysis may operate through chromium in valency states below 6. Nevertheless it is desirable during the heat activation of catalysts of this type, including the catalyst employed in the process of the present invention, that conditions which favour the formation of, or retention of, chromium in the higher valency states should be employed. The heat activation is preferably carried out in a non-reducing atmosphere and most preferably in an oxidising atmosphere or in vacuo. Dry air is an example of a suitable oxidising atmosphere. The heat activation must be performed under anhydrous or dehydrating conditions and the activated catalyst must be protected from ingress of moisture.

In the organometallic compound employed in the present invention the $R_2$ group is preferably an alkyl, cycloalkyl or aryl group. Metal alkyls are preferred, particularly aluminium trialkyls.

The metal present in the organometallic compound in the present is preferably lithium, sodium, beryllium, magnesium, calcium, zinc cadmium, boron, aluminium or gallium. Metal alkyls particularly preferred are dibutyl magnesium, triethyl boron, triethyl aluminium, triisobutyl aluminium. The quantity of organometallic compound employed is suitably 0.1 to 100%, preferably 1 to 10 wt % based on the total weight of catalyst.

The polymerisation conditions employed in the present invention can be any of the conditions used in Phillips polymerisation processes. Preferably the polymerisation conditions are the so called "particle form" process conditions. In the "particle form" process the monomeric 1-olefin is contacted with a suspension or a fluidised bed of the catalyst particles in a fluid medium under conditions such that the polymeric 1-olefin forms as solid particles suspended in or fluidised in the fluid medium.

The fluid medium employed in particle form process conditions can be a liquid or a gas. Preferably it is a liquid. Examples of suitable liquid media are hydrocarbons which are chemically inert and non-deleterious to the modified catalyst under the reaction conditions. Preferred liquid media are paraffins or cycloparaffins having from 3–30 carbon atoms per molecule, for example isopentane, isobutane, cyclohexane. Most preferably the liquid medium is isobutane.

When a liquid medium is employed in the process of the present invention preferably the concentration of monomer therein is in the range 2–20 wt % although concentrations outside this range can be employed if desired.

When the process of the present invention is under particle form process conditions the polymerisation temperature is preferably in the range 50° to 112° C., most preferably 80° to 108° C.

The polymerisation pressure is preferably in the range 2 to 100 bar when the fluid medium is a liquid and 1 to 60 bar when the fluid medium is a gas. The residence or reaction time can vary from a few minutes to several hours and is generally in the range 15 minutes to 3 hours. The particle form process can be conducted under batch or continuous polymerisation conditions. Preferably the conditions are continuous. Preferred apparatus for conducting the reaction under continuous conditions in a liquid medium is described in UK Patent Specification No. 899,156.

For further details of examples of solution form and particle form process conditions and apparatus which can suitably be employed in the process of the present invention, reference may be made to UK Patent Specification Nos: 790,195, 804,641, 899,156, 886,784 and 853,414.

The present invention further provides a catalyst for polymerising 1-olefins prepared by (a) supporting chromium oxide, or a compound calcinable thereto, on a refractory oxide support material, (b) adding one or more tetravalent titanium compounds selected from (1) $TiO_2$, (2) $TiOCl_2$, (3) titanium acetyl acetonate compounds, (4) alkanolamine titanates and (5) compounds having the general formula $Ti(OR)_m X_n$, wherein m+n is 4, m is zero or an integer from 1 to 4, R is an organic hydrocarbon group having 1 to 12 carbon atoms, X is halogen or a hydrocarbon group and when the titanium compound contains more than one R or X group the groups may be the same or different, (c) heating the product under such conditions that an active polymerisation catalyst is formed, (d) and adding to the active polymerisation catalyst one or more organometallic compounds having the general formula $MR^2{}_p Y_{q-p}$ wherein M is a metal of groups 1A, 2A, 2B or 3A or the Periodic Table (Mendeleef), $R^2$ is a hydrocarbon group containing 1 to 10 carbon atoms, Y is hydrogen or halogen, q is the valency of M, p is an integer from 1 to q inclusive and when the organometallic compound contains more than one $R^2$ or Y group they may be the same or different.

The catalyst components and the methods of preparation are preferably substantially as hereinbefore described.

Isolation of the produced polymer may be conducted using the techniques well known in the art.

The invention is illustrated in the following Examples.

EXAMPLE 1

(a) Catalyst Preparation 30 g of a commercial chromia on silica catalyst base (ID 969, W R Grace and Co) was slurried in 300 ml petroleum ether (40°-60°), 4.5 g (4.7 ml) titanium tetraisopropylate (Titanium Intermediates Ltd) was added and the petroleum ether distilled off in a rotary evaporator. The catalyst was stored under dry nitrogen, then activated by heating at 500° C. for 5 hours in a bed fluidised with 900 ml/min of dry air. After cooling, the catalyst was stored under dry nitrogen. Analysis showed that it contained 1.00% by weight Cr, 2.42% by weight Ti and 0.87% by weight $Cr^{VI}$.

(b) Polymerisation

Polymerisation was carried out in a 2.3 liter stainless steel stirred autoclave. The reactor was purged with nitrogen, baked out for 2 hours at 110° C., then cooled to 102° C. The catalyst prepared as described above was charged to the reactor followed by 0.20 ml of a 10% by weight solution of triethyl aluminum in n-hexane (=17 mg triethyl aluminium) in one liter of dry isobutane.

The reactor temperature was maintained at 102° C. and ethylene was added to bring the total pressure in the reactor to 41.4 bar. Ethylene was added continuously throughout the run to maintain this pressure. Polymerisation and polymer property data are shown in Table 1. The Kd value is determined by a method similar to that given in Sabia, R, J Appl Polymer Sic. 1963, 7, 347. Kd is a measure of polymer shear response and, generally, Kd increases with breadth of polymer molecular weight distribution. The $MI_{2.16}$ is the 'melt index' and the $MI_{21.6}$ the 'high load melt index' determined according to ASTM method 1238 using 2.16 kg and 21.6 kg loads respectively. The units are grammes per 10 minutes. The melt index ratio MIR is $MI_{21.6}/MI_{2.16}$.

EXAMPLE 2

(a) Catalyst Preparation

The method of preparation was the same as that used for Example 1, part (a) except that 50 g of ID969 catalyst and 3.1 ml of titanium tetraisopropylate were used and the activation temperature was 600° C. Analysis of the catalyst showed that it contained 1.09% by weight Cr, 0.80% by weight Ti and 1.02% by weight $Cr^{VI}$.

(b) Polymerisation

The polymerisation was carried out as described in Example 1, part (b), except the polymerisation temperature in this case was 104° C.

The polymer data shown in the Table indicate that polymer of broader molecular weight distribution has been prepared over the Phillips catalyst modified with titanium and alkyl than would be made over an unmodified Phillips catalyst under the same polymerisation conditions.

TABLE 1

| Example No. | Weight (mg) Catalyst | Weight (mg) AlEt$_3$ | Polymerisation Time (min). | Yield (g) of polymer | Polymer $MI_{2.16}$ | Polymer $MI_{21.6}$ | Polymer MIR | Polymer Kd |
|---|---|---|---|---|---|---|---|---|
| 1 | 390 | 17 | 31 | 430 | 0.05 | 5.0 | 100 | 6.1 |
| 2 | 399 | 17 | 29 | 442 | 0.19 | 13.0 | 65.6 | 5.0 |

I claim:

1. A process for polymerizing ethylene or a mixture of ethylene with up to 40 wt % (based on a total monomer) of other 1-olefinic monomer comprising (a) supporting chromium oxide, or a compound calcinable thereto, at the heating temperature stated in part (c) hereof, on the refractory oxide support material comprising silica, (b) adding a tetravalent titanium compound having the formula $Ti(OR)_m X_n$, wherein m+n is 4, m is zero or an integer from 1 to 4, R is an organic hydrocarbon group having 1 to 12 carbon atoms, X is halogen or a hydrocarbon group and when the compound contains more than one R or X group, the groups may be the same or different, (c) heating the product at a temperature of from about 400° to 900° C. such that an active polymerization catalyst is formed, and (d) contacting the monomer with the active polymerization catalyst in the presence of an aluminum trialkyl, said tetravelent titanium compound being added in an amount sufficient to give a titanium concentration in the range of 0.05 to 20% by weight and said aluminum trialkyl being employed in the amount of 0.1 to 100% by weight based on the total weight of the catalyst.

2. A process as claimed in claim 1 wherein ethylene is the sole 1-olefinic monomer.

3. A process as claimed in claim 1 wherein the titanium compound has the general formula $(RO)_4Ti$ wherein R represents an alkyl group containing 1 to 6 carbon atoms.

4. A process as claimed in claim 1 wherein the titanium compound is tetraethyl titanate or tetraisopropyl titanate.

5. A process as claimed in claim 1 wherein the quantity of titanium compound employed is sufficient to give a titanium concentration in the product from step (b) in the range 0.5 to 5 wt %.

6. A process as claimed in claim 1 wherein the organometallic compound is triethyl aluminium or triisobutyl aluminium.

7. A process as claimed in claim 1 wherein the polymerisation is carried out by contacting the monomer with a suspension or a fluidised bed of the catalyst particles in a fluid medium under conditions such that the polymeric 1-olefin forms as solid particles suspended in or fluidised in the fluid medium.

8. A process as defined in claim 1, wherein the quantity of chromium compound supported on the refractory oxide is sufficient to provide a chromium concentration of about 0.2 to 30 wt. % based on the weight of the chromium compound and support together.

9. A catalyst for polymerizing 1-olefine prepared by (a) supporting chromium oxide, or a compound calcinable thereto at a heating temperature stated in part (c) hereof, on a refractory oxide support material comprising silica, (b) adding a tetravalent titanium compound having the general formula $Ti(OR)_mX_n$, wherein m+n is 4, m is zero or an integer from 1 to 4, R is an organic hydrocarbon group having 1 to 12 carbon atoms, X is halogen or a hydrocarbon group and when the titanium compound contains more than one R or X group the groups may be the same or different, (c) heating the product at a temperature of from about 400° to 900° C. such that an active polymerization catalyst is formed and (d) adding to the active polymerization catalyst an aluminum trialkyl compound, said tetravalent titanium compound being added in an amount sufficient to give a titanium concentration in the range of 0.05 to 20% by weight and said aluminum trialkyl being employed in an amount of 0.01 to 100% by weight based on the total weight of the catalyst.

10. A catalyst for polymerizing 1-olefins as defined in claim 9, wherein the quantity of chromium compound supported on the refractory oxide is sufficient to provide a chrominum concentration of about 0.2 to 30 wt. % based on the weight of the chromium compound and support together.

* * * * *

UNITED STATES PATENT AND TRADEMARK OFFICE
CERTIFICATE OF CORRECTION

PATENT NO. : 4,517,345
DATED : May 14, 1985
INVENTOR(S) : PAUL L. EVE et al

It is certified that error appears in the above-identified patent and that said Letters Patent is hereby corrected as shown below:

Col. 1, line 63, "cabalt" should read --cobalt--

Col. 4, line 18, "R2" should read --$R^2$--

Col. 6, claim 1, line 50, "on the refractory oxide support" should read --on a refractory oxide support--

Signed and Sealed this

Seventeenth Day of September 1985

[SEAL]

Attest:

Attesting Officer

DONALD J. QUIGG

Commissioner of Patents and Trademarks—Designate